(12) United States Patent
Andersson

(10) Patent No.: US 6,766,488 B2
(45) Date of Patent: Jul. 20, 2004

(54) COMPRESSING INFORMATION USING CAM FOR NARROW BIT PATTERN OUTPUT

(75) Inventor: Anders J. Andersson, San Jose, CA (US)

(73) Assignee: Nohau Corporation, Campbell, CA (US)

( * ) Notice: Subject to any disclaimer, the term of this patent is extended or adjusted under 35 U.S.C. 154(b) by 432 days.

(21) Appl. No.: 09/998,769

(22) Filed: Nov. 29, 2001

(65) Prior Publication Data

US 2003/0074624 A1 Apr. 17, 2003

Related U.S. Application Data

(60) Provisional application No. 60/329,614, filed on Oct. 15, 2001.

(51) Int. Cl.[7] .............................................. G06F 11/00
(52) U.S. Cl. ........................................ 714/738; 714/733
(58) Field of Search ............................. 375/368; 341/67; 712/33; 714/720, 738, 733, 724; 711/108

(56) References Cited

U.S. PATENT DOCUMENTS

| | | | | |
|---|---|---|---|---|
| 5,297,185 A | * | 3/1994 | Best et al. ................ | 375/368 |
| 5,748,688 A | * | 5/1998 | Kim et al. ................ | 375/368 |
| 6,121,905 A | * | 9/2000 | Redford .................... | 341/67 |
| 6,141,743 A | * | 10/2000 | Strongin ................... | 712/33 |
| 6,185,522 B1 | | 2/2001 | Bakker ..................... | 703/28 |
| 6,345,372 B1 | * | 2/2002 | Dieckmann et al. ....... | 714/720 |
| 6,553,453 B1 | * | 4/2003 | Gibson et al. ............. | 711/108 |

* cited by examiner

Primary Examiner—David Ton
(74) Attorney, Agent, or Firm—Thomas Schneck

(57) ABSTRACT

A data compression device that serves the purpose of receiving large numbers of bits from inside a microcontroller or device under test which are fed to the data compression device featuring a content addressable memory and associated comparators that will recognize recurring digital data patterns. Each recognized large bit pattern will translate to a small bit numeric value that is output on an encoder output trace port. The trace port refers to the actual physical pins on the outside of the compression device that will be connected to the emulation or tracing instrument recording the sequence of patterns coming out from these very few pins.

8 Claims, 1 Drawing Sheet

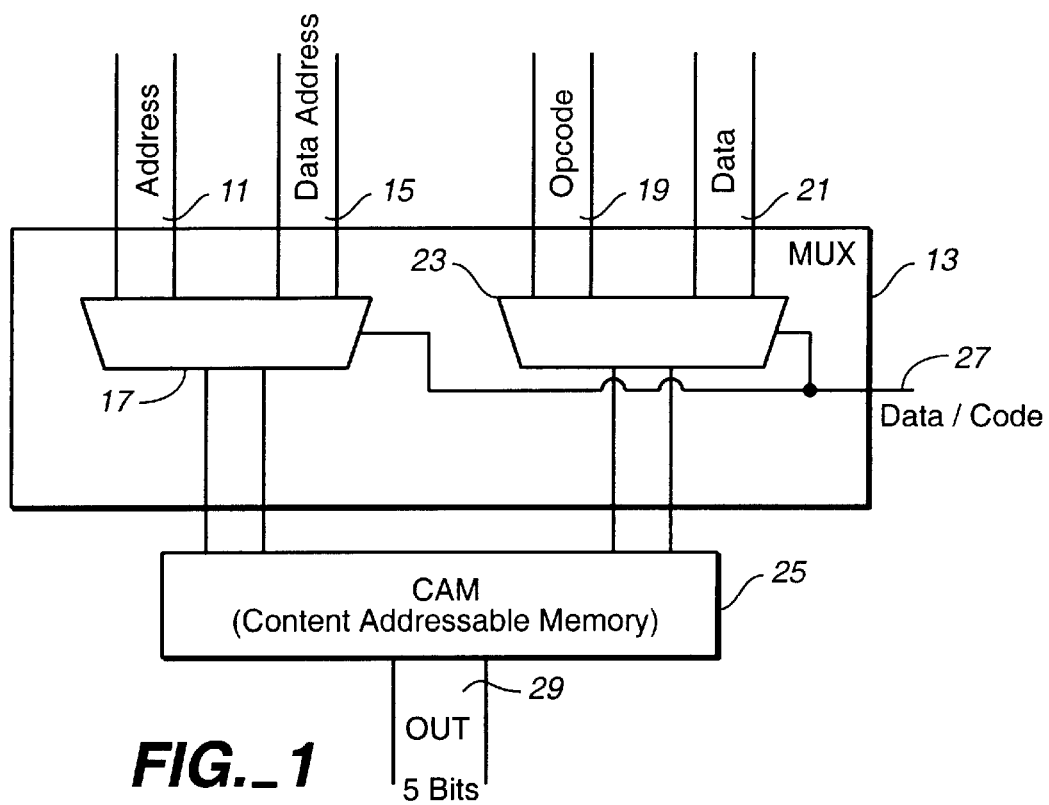
FIG._1
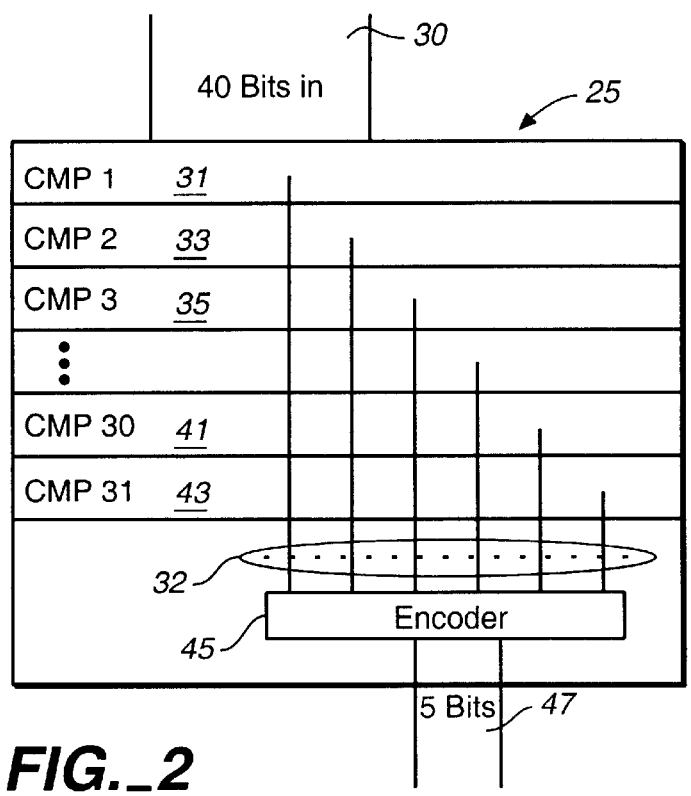
FIG._2

US 6,766,488 B2

COMPRESSING INFORMATION USING CAM FOR NARROW BIT PATTERN OUTPUT

CROSS-REFERENCE TO RELATED APPLICATION

This application claims priority from U.S. provisional application No. 60/329,614, filed Oct. 15, 2001.

FIELD OF THE INVENTION

The invention relates to digital data compression using content addressable memory devices.

BACKGROUND ART

During the last 15 years, emulation devices used to debug microcontroller code have gained in popularity. The emulator, as the test instrument, gives the user ability to see what is going on inside the microcontroller silicon. Quite often, the emulator has a special emulation chip, called a "bond-out", that is performing the normal tasks of the real microcontroller while also bringing out the internal signals from the silicon so they can aid in the debugging by giving visibility to internal buses.

Lately, the demand for lower cost of the emulation chip as well as of the emulator has resulted in a need for solutions where the actual real customer silicon is used for the emulation. This leads to a struggle between silicon cost and emulation features, which results in very few pins carrying as much information as possible.

Currently, two different schemes are used. In a first scheme, only some of the information is transmitted as "packages" out of the silicon on a few pins. This may require the silicon to actually stall execution not to lose information. In a second scheme, selected parts of the information, such as every fourth program counter, are transmitted out, resulting in ambiguity due to the face that the program counter values that are in between never come out.

The object of the invention is to provide real-time, no-loss transmittal of user-selected information to be transferred over vew few IC pins with no limit to the input data which should be studied inside the silicon.

SUMMARY OF THE INVENTION

This invention brings out internal signals from a silicon device under test such as a microcontroller at real-time using a content addressable memory delivering an output bit pattern to as few IC pins as possible, a requirement for the modern microcontroller debug industry. The invention applies to so-called "soft cores" which typically are implemented in FPGA's and CPLD's, ASIC designs, as well as real microcontroller architectures.

The invention relies upon the occurrence of characteristic bit patterns to be generated repeatedly in data communications between a device under test and a tester. This allows a large number of bits of the characteristic bit pattern to be compressed by using a content addressable memory, CAM hereafter, to translate a large bit pattern to a small bit pattern, say as few bits as five, i.e. a token, while still allowing the emulation user to see and understand what is going on inside the device under test.

BRIEF DESCRIPTION OF THE DRAWINGS

FIG. 1 is a schematic diagram of an compression apparatus in accordance with the present invention.

FIG. 2 is a plan view of a content addressable memory used in the apparatus of FIG. 1.

DESCRIPTION OF THE INVENTION

With reference to FIG. 1, an address bus 11, typically 24 bits, as shown, feeds digital signals to a microcontroller 13. The data address bus 15, typically 24 bits, is also shown to feed microcontroller 13. Both the address bus 11 and the data address bus 15 feed multiplexer 17. An opcode bus 19, typically 16 or 32 bits, also feeds digital signals to microcontroller 13, together with data bus 21, typically 16 or 32 bits, both feeding multiplexer 23. Multiplexers 17 and 23 allow the CAM 25 to either select the data or the opcode information by means of control line 27. Multiplexers are optional, although the input into the CAM would become wider.

CAM 25 is a programmed memory device that upon recognition of a bit pattern upon its input pins provides an output at port 29 of a numerical value, i.e. a token, that shows which pattern was recognized, as selected recurring patterns were programmed prior to the use of the CAM. The invention takes advantage of the fact that in circuit emulation, many recurring bit patterns are known, a priori. When a known bit pattern is recognized during circuit testing, a narrow bit pattern, i.e. a token, is substituted by the CAM.

With reference to FIG. 2, inputs 30 to the CAM 25 of many bits of information, say 40 bits wide, are shown coming from a microcontroller or other source. A number of comparators 31, 33, 35, 41, 43 are pre-programmed with different patterns that they will recognize because each is a recurring pattern. A comparator that recognizes its pre-programmed pattern will signal the equality by a logic high on its single output signal. An encoder 45 receives all the outputs from the comparators and translates the recognized pattern to a numerical value, meaning that if the third comparator 35 signals high on its output signal, the binary code would be 0 . . . 011 which represents the number three in binary code, i.e. the token.

The encoder 45 has an output port 47 having dedicated output pins on a silicon device, called a trace port, carrying the numeric value from the CAM's output. This port is then connected to the emulation tool that will "trace" or "record" the sequence of patterns as they arrive in real-time.

The CAM allows words to be stored at specific memory locations, and the stored word is compared to the CAM input simultaneously to all the other stored words in the CAM. The output of the CAM is a numeric value shown which of the stored words compared equal to the input. Often, a priority scheme needs to be implemented in the CAM if several words would compare in the input. In the illustrated embodiment, no priority scheme is necessary because the CAM would be pre-programmed in such a way that no multiple matches would be possible, thereby simplifying the CAM implementation.

The input to the CAM would be m bits, where "m" typically is a number larger than 40. These bits are what the comparators compare the pre-programmed patterns to. The output of "n" bits, where "n" is typically a number small than 8, presents which comparator recognized a match. By using this method, a real-time data compression of a factor 5 to 10 can realistically be accomplished without losing any real-time information. The program patterns in the CAM are set up to recognize only the interesting patterns generated by the microcontroller execution flow. The patterns would typically be programmed as the entry points of each interesting function to get an overview. The patterns could then be programmed to represent each source line address of an interesting function. Thereafter, the patterns can be programmed to represent each assembly code address of a particular source line. By using this scheme, the user can "zoom in" on the area of execution that they are particularly interested in, again with no real-time loss.

A typical CAM for this application is comprised of m comparators that compare the address and data bus to a given value. Each comparator outputs a single bit that would indicate a match. These m bits indicating a match would go to an encoder that outputs a binary code that shows which comparator gave a match. This means that 32 40-bit comparators can output useful information in 5 bits of binary code.

What is claimed is:

1. A method for testing the performance of a digital device normally indicated by an "m" bit pattern and outputting an "n" bit pattern for trace information on a small number of leads, where m is greater than n, said method comprising:
   a) testing the digital device and generating "m" bit characteristic data patterns;
   b) recognizing patterns within the "m" bit characteristic data;
   c) outputting an "n" bit pattern representing the "m" bit recognized pattern.

2. The method of claim 1 further including multiplexing the information sent from the digital device.

3. The method of claim 1 further including producing a real-time sequence output of test patterns of interest.

4. A system for testing the performance of a digital device normally outputting an "m" bit pattern of test data comprising:
   a) a digital device having means for outputting "m" bit test data; and
   b) a processing unit connected to the silicon device and including means for recognizing and compressing "m" bit test data, said processing unit having:
      i) a content addressable memory, said content addressable memory having a plurality of comparators, each of said plurality of comparators pre-programmed to recognize a distinct pattern of information and having the means to signal such recognition; and
      ii) an encoder having the means to receive signals from the plurality of comparators and output said signals as an "n" bit numerical value associated with the comparator sending said signal, where "m" bits is greater than "n" bits.

5. The system of claim 4 further including at least one multiplexer having the means to receive information from the digital device and transmit said information to the processing unit.

6. The system of claim 4 wherein the digital device is a microcontroller.

7. The system of claim 4 wherein the tool is an emulation tool.

8. The system of claim 4 wherein the processing unit is inside the digital device.

* * * * *